(12) United States Patent
Bailey et al.

(10) Patent No.: US 8,170,239 B2
(45) Date of Patent: May 1, 2012

(54) VIRTUAL RECORDING STUDIO

(75) Inventors: Kenneth S Bailey, San Jose, CA (US); Christopher Carmichael, Laguna Beach, CA (US)

(73) Assignee: Ubiquity Holdings Inc., San Juan Capistrano, CA (US)

( * ) Notice: Subject to any disclaimer, the term of this patent is extended or adjusted under 35 U.S.C. 154(b) by 1056 days.

(21) Appl. No.: 12/031,060

(22) Filed: Feb. 14, 2008

(65) Prior Publication Data

US 2008/0260184 A1 Oct. 23, 2008

Related U.S. Application Data

(60) Provisional application No. 60/889,907, filed on Feb. 14, 2007.

(51) Int. Cl.
*H04B 1/00* (2006.01)

(52) U.S. Cl. .......................................... 381/119; 700/94

(58) Field of Classification Search .................. 381/119; 700/94
See application file for complete search history.

(56) References Cited

U.S. PATENT DOCUMENTS

2006/0283310 A1* 12/2006 Bicker ............................ 84/645
* cited by examiner

*Primary Examiner* — Douglas Menz
(74) *Attorney, Agent, or Firm* — Law Office of Scott C. Harris, Inc.

(57) ABSTRACT

A virtual recording studio is formed based on information from a number of different locations. One instrument may be located locally, and other instruments may be located remotely, for example accessible over the Internet. The remote instruments may be combined with outputs from other instruments, to create a virtual recording studio where parts of it are available over the Internet. An electronic music component may also be used. The remote and local capture information may also include cameras that capture video information or still image information and combines those parts together, either with each other, or with another part.

17 Claims, 6 Drawing Sheets

ORIGINAL GARAGE BAND PERFORMANCE

GARAGE BAND TEMPLATE READY FOR SUPERIMPOSED FACE IMAGES

VIRTUAL RECORDING STUDIO

The present application claims priority from provisional application No. 60/889,907 filed Feb. 14, 2007, the disclosure of which is herewith incorporated by reference.

BACKGROUND

Many websites allow a virtual experience where users can have virtual lives that they live out on the website. Within that website, the users can for example make friends, purchase property and other items, and do many things that they can do in their real lives.

SUMMARY

An embodiment describes a virtual recording studio system in which a recording is made in a studio like environment, where band members are only virtually present and in which the musical elements can be combined to create a musical composition.

Another embodiment describes a virtual movie studio forming a visual experience system to form a music video in which the people—e.g., the actors, cast members, stage and scenery are simulated.

DETAILED DESCRIPTION

Figure 1:
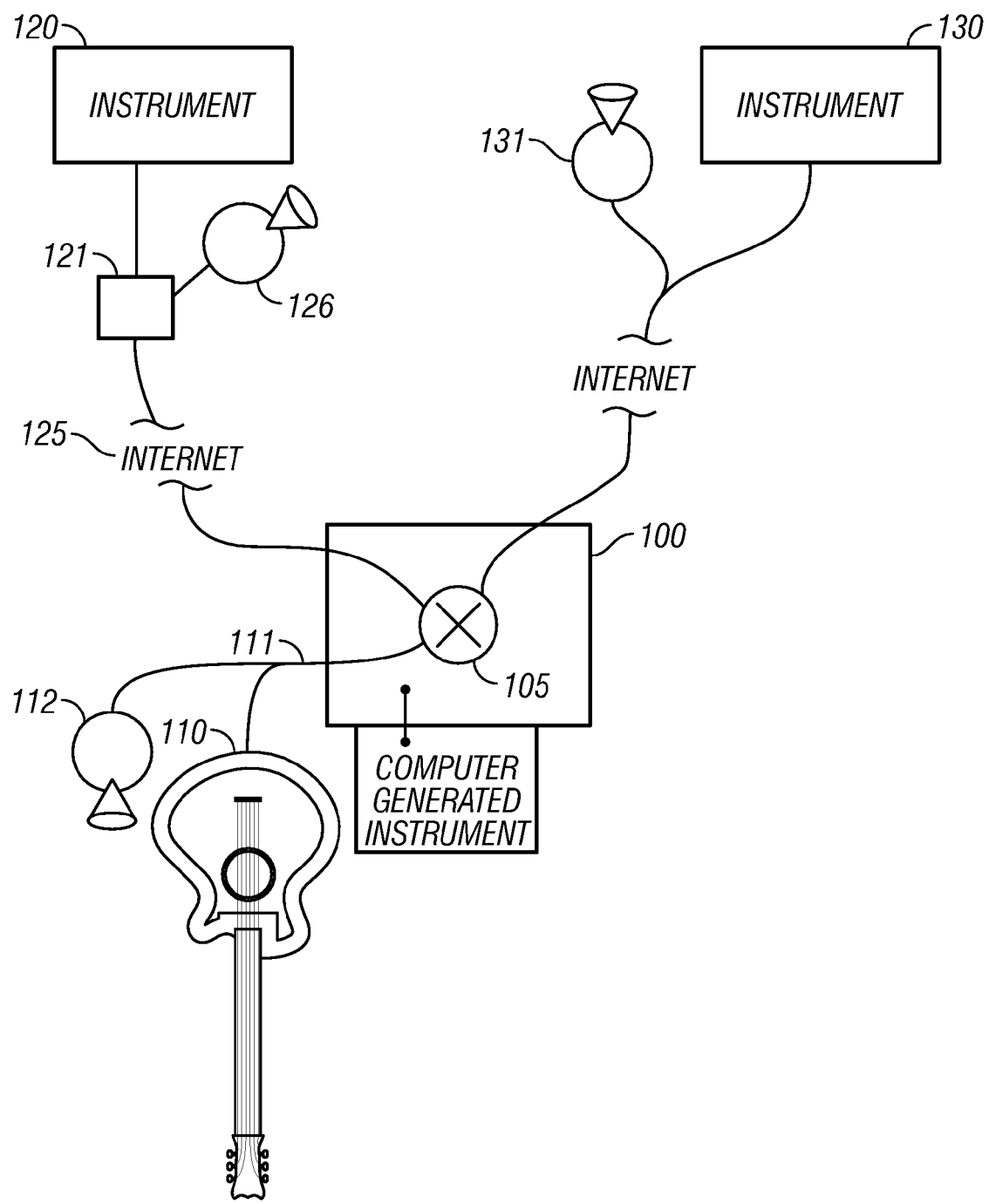
FIG. 1 shows a block diagram of the virtual recording system including local parts and remotely accessible part.

FIG. 1 illustrates a virtual recording studio which allows creation of music and music videos with band members or or employees who are at remote locations. In the embodiment, one or more users can play virtual or real instruments, the outputs from which are received in the computer. The outputs from the musical instruments can be combined by the virtual mixer that can be hardware and/or software residing in the computer. In an embodiment, the computer can produce accompaniment by some of the instruments as part of the mixing.

FIG. 1 illustrates an embodiment in which the virtual mixer computer 100 includes a computer mixing component 105 that receives sounds from a number of different sources. An instrument 110 may be local, providing an output 111 into a port of the computer 100, and to the mixing process 105. A camera 112 may also be locally provided. In addition, one or many of the band members, and their different instruments, may be remote. For example, instrument 120 may be in a first remote location, connected to the computer 102, over a digital channel, such as the Internet, shown generally as 125. A camera 126 may also be located at the remote location. These may be connected through an interface box shown generally as 121.

Other instruments 130, and others may be directly connected to the Internet, or may be connected through an interface box.

Each instrument may also have an associated camera 131, or alternatively, there can be multiple cameras, though not necessarily one at each location.

An alternative system may use a music player, e.g., an IPOD or other music player.

An embodiment recognizes that body language is an important part of any communication, including music and movies. Accordingly, the use of body movement style data entry devices may enhance the realism of a music video of this embodiment. An embodiment obtains images of band members, e.g. from the cameras. A data glove or other kind of three dimensional information may also be obtained; indicative of movement of the band members, or of movement of an actor, herewith called an "imposter". The users' faces or other likeness may also be captured by the cameras.

A virtual personality of a person being characterized is captured in computer imagery by the camera. The computer 100 operates to edit and combine previously captured images or videos indicative of a likeness of a person or persons being imaged. New gestures and/or movements can be supplanted on the virtual scene. For example, hand gestures, facial expressions, body movement and lip synchronization may be used to create videos that are synchronized with the music.

Voice matching can also be used in addition to, or as an alternative to, images of real persons. For example, virtual images or virtual voices can be created from silhouettes or voice prints of real people. A famous person, for example, could be used so that their voice and likenesses are images well recognized worldwide. This can be used to create a virtual image of the artist in a new venue, for example in a simulated concert environment.

The virtual image is created by taking a previously stored video, slicing it using video editing software, and using a voiceprint type technique to add the voice of the famous person doing words and lyrics of the new song. This system can then create images and voices, store those words and lyrics, and transfer them to a device such as a cellular phone or laptop. Images including caricatures of the person or virtual person doing something can also be used for this purpose.

According to one embodiment, the voice matching can compare to the original artist in range, intonation, expression, and inflections, for example. For audio re-creation, the voice-print can be taken from the soundtrack of the previously recorded song, or voice sound bite, and converted to current words or lyrics. This can use an audio editing process, such as the Roland model VS2480 DVD workstation system or can use other software, for example.

Another embodiment allows a band to practice together from remote locations, and to make videos that include images or movement or partial images of themselves playing together even from these remote locations.

This system allows forming a garage band essentially over the Internet. Such a garage band could take on new meaning when the performers are musicians who can be in different cities. For example, the lead singer can be singing from Toledo, Ohio, while the drummer is drumming in New York City. The bass guitar player may be in London at this time.

Video images of this group performing a song can be obtained by combining the images in a steaming process that seams the images together from the different sources. The audio sounds and musical accompaniment can be blended together while the images are then joined for the effect. The end result is that the resultant music appears to be all from the same location, when actually different people are at different locations.

In each of these examples, the video and audio images are seamed together to create a finished looking and sounding performance.

An important element of an embodiment is the manner in which the images are married together. A person's image can be added to the video, so that a person, for example, who was no longer alive or no longer making movies or the like can be included into a video of this type—e.g. to look like an original or sound like a studio recording session. This allows using standard off-the-shelf hardware. The software and image audio parceling and pasting can also be used to create advantages. A technique can be used to combine the raw images, simulated motion templates, and audio sound bites.

Movement decisions can be predicated on the joint location and movement criteria. People placed in the virtual scenes relate in size and stature to the scenery, both in the foreground and background effects. For example, trees have joint places at the place where the branches of the tree meet the tree base. Spatial relationship points are first plotted in wire frame references to adjust the positioning relative to the size. People are then placed in the scene to fit the overall picture. For example, a person's elbow and wrist motions may be tracked and routed in the wire frame before the final cut. Similarly, the schemes track points associated with the person's hips, knees, ankles, and feet positioning, in order to allow the movement to flow naturally in the virtual scene. Field of motion derivative vectoring shows normal fields of motion as compared with the virtual activity field of measurements for vectoring and charting of the movements. Filters can be used to determine the primary visual focus points. For example, phase congruency history and threshold techniques may be used to set the elimination and contrast invariants, and to determine rollover at curves and edges. Color variants are determined from a color chart that highlights images with primary colors shadowed with images and to create deep shadows of the foreground as contrasted to the background surrounding imagery.

Once the process has been mastered, a master template is created to record where the pieces are placed. This master template may be like a seating chart. Once the template has been approved by the art director, filler is added to the wire frame, and color is subsequently added. Luminance is computer generated to match the normal scene at levels that are predetermined from a master template of variables. The final motion and animation is created by a motion animation algorithm and a motion suit worn by an actor. The actions in the motion suit create motion data that is compiled by a computer to generate the action and the captioned scenes.

Scenes may be modified or edited by an art director or editing team, for example. The final cut is designed to exemplify the singer being re-created in a real-time environment as if the scene were being performed in real time before a live audience. Images can then be stored or transported on any standard image media, such as DVD, CD, hard drive, flash memory, or the like. The images may also be e-mailed, downloaded or uploaded to be edited at a different location.

Figure 2:
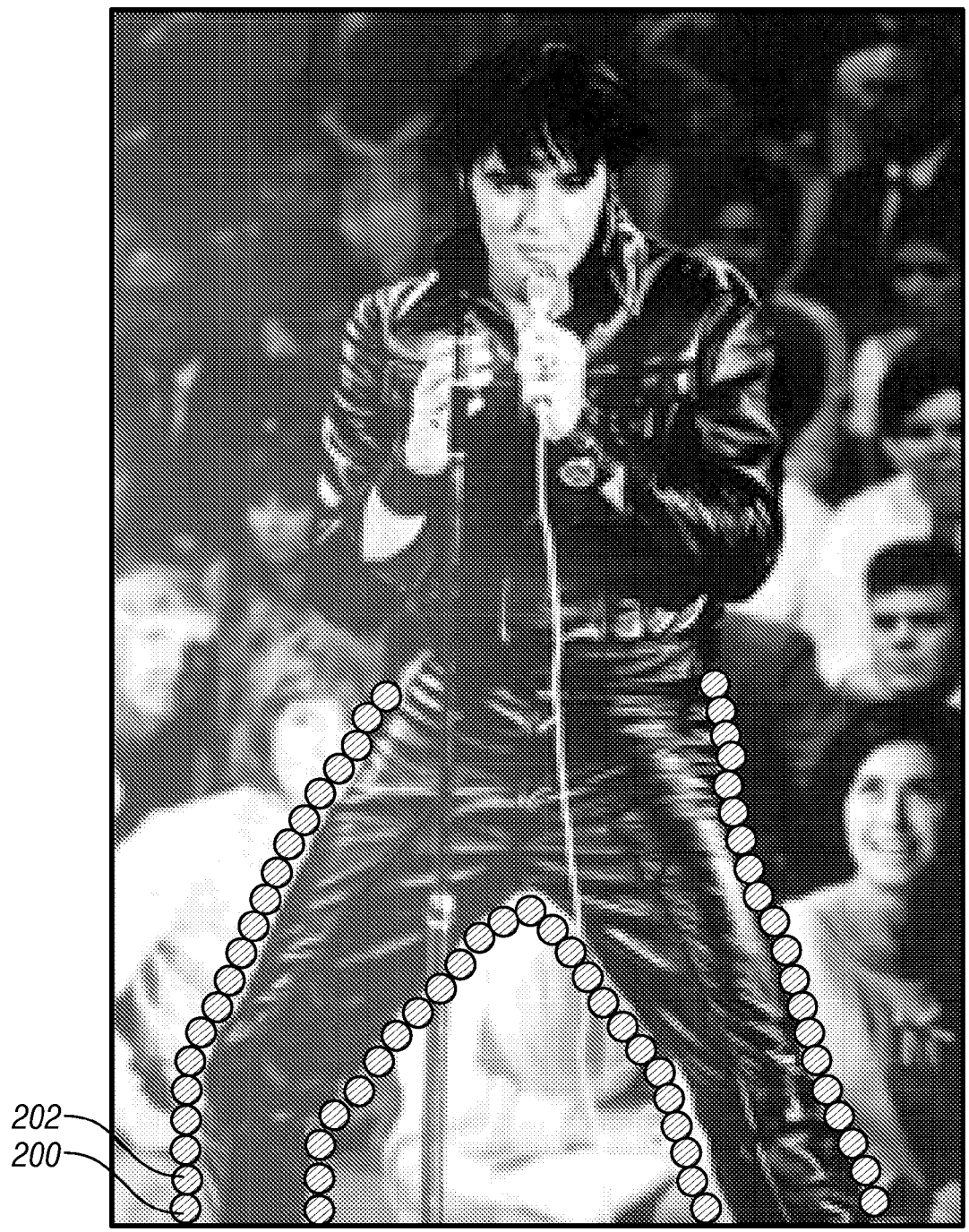
FIG. 2 shows an image and capture points to convert to motion.

FIG. 2 illustrates how an image or frame of a video can be obtained. A set of capture points 200, 202, etc, can be created on the image. These points are used to create motion recognition points. The movement of these motion recognition points can then be coordinated with the actual music being played.

An image of the artist, e.g., a famous artist, can also be obtained. The face of the artist can be combined with some other part of an image or video, to provide the remaining part of the image from that other part. For example, the image may be converted to a wire frame image.

Figure 3:
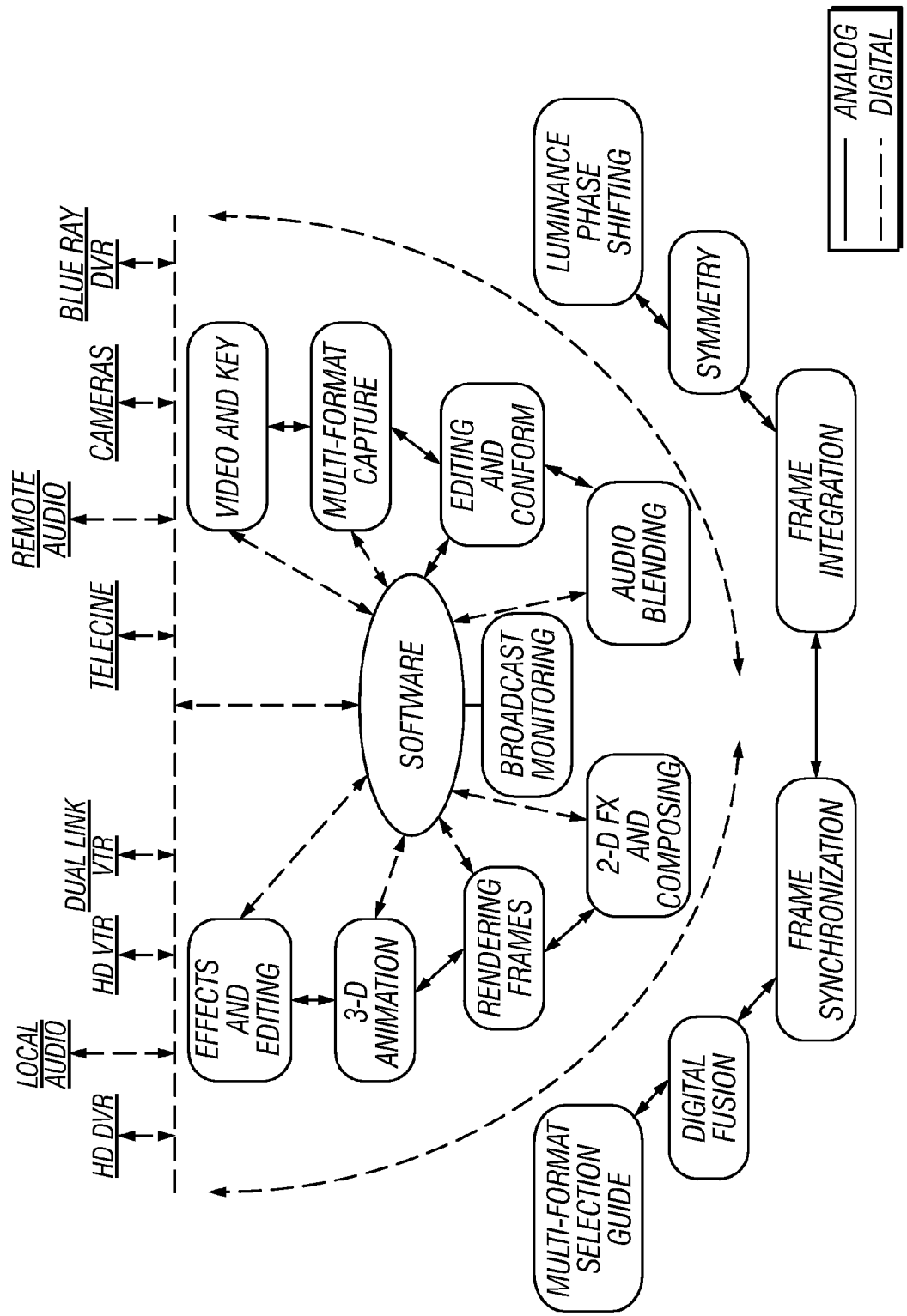
FIG. 3 shows a creation and editing system.

FIG. 3 illustrates a complete block diagram of the system. An image, video and/or audio can be obtained from a number of different sources; here a high definition DVR, high definition video tape recorder, telecine, cameras, or other similar devices, as well as local audio and remote audio. The computer carries out effects and editing on the information it receives, including carrying out 3-D animation, frame rendering, audio blending, editing, multi-format capturing, and keyframes may also be obtained. All the image parts may be obtained digitally. Analog operations may also include a multiformat selection guide, digital fusion, frame synchronization, frame integration, symmetry editing, and luminance phase shifting.

The operation allows video and/or images of an original concert or other music video to be first played. The images and videos can be from a capture card, voice bites, etc.

Figure 4:
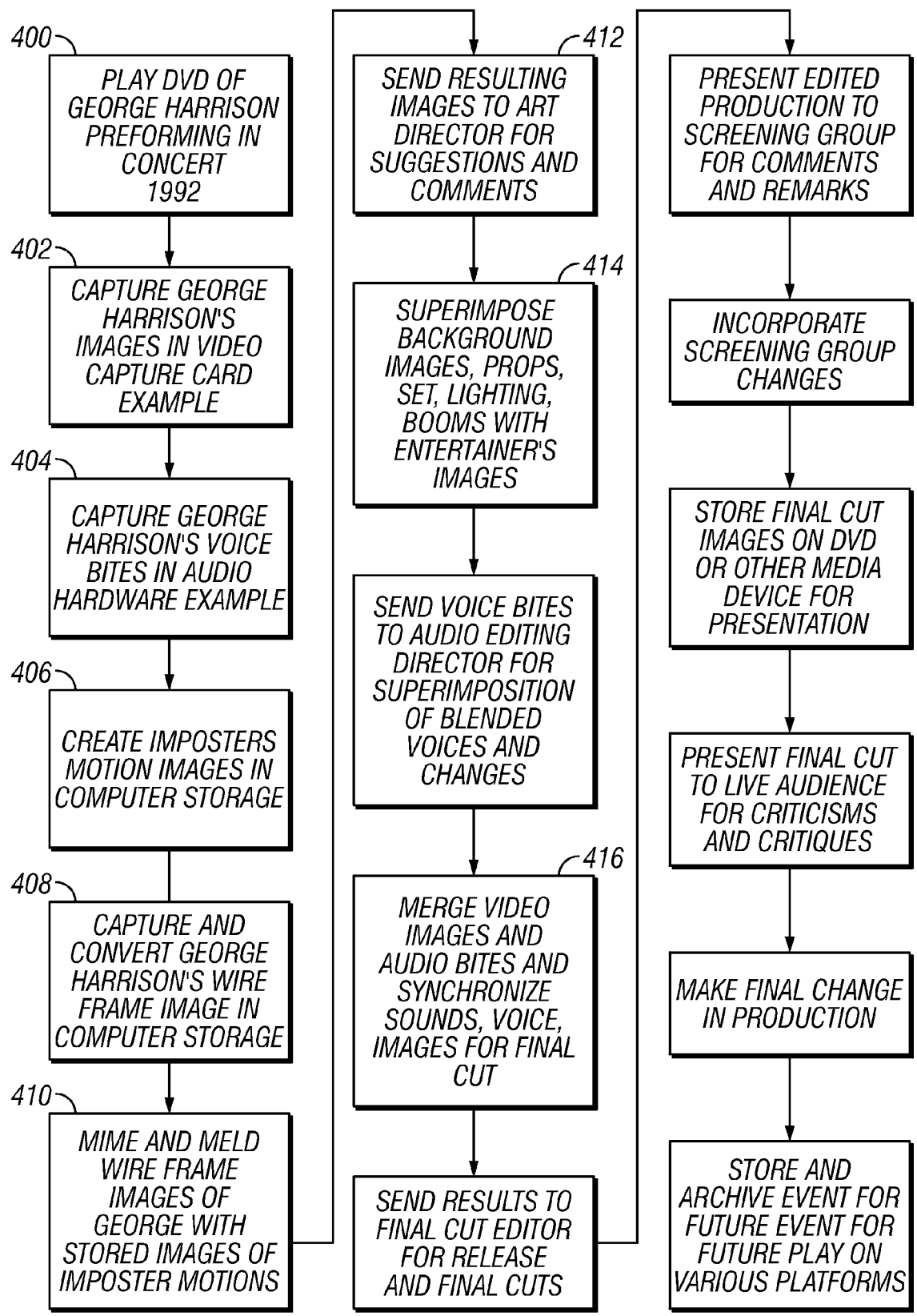
FIG. 4 illustrates a flow chart of re-creating a virtual image.

FIG. 4 illustrates how this system can be used, for example, to create a virtual image reach irradiation. At 400, an original video, for example a video of George Harrison performing in concert, is played. At 402, the images of George Harrison are captured, for example in a video capture card. Voice bites are also captured at 404. Alternatively, 404 may use local or remote audio, and may use this directly, or change to sound more like George Harrison.

At 406, "imposters" are created in the computer storage. 408 illustrates capturing George Harrison's image, e.g. has a wireframe image, in the computer storage. At 410, the wireframe images are placed together with the imposter motions. In other words, the image of George Harrison is changed according to the imposter motion.

This can be edited at 412, and background, images, props, lighting, booms, and other things can be superimposed at 414. Synchronization can be carried out at 416. At each step, additional editing can also be carried out.

These results are sent to the final cut editor for release and final cuts. The edited production is then sent to the screening group for comments and remarks. Any changes are incorporated, and the final cut is stored on DVD or other media device for presentation.

Figure 5:
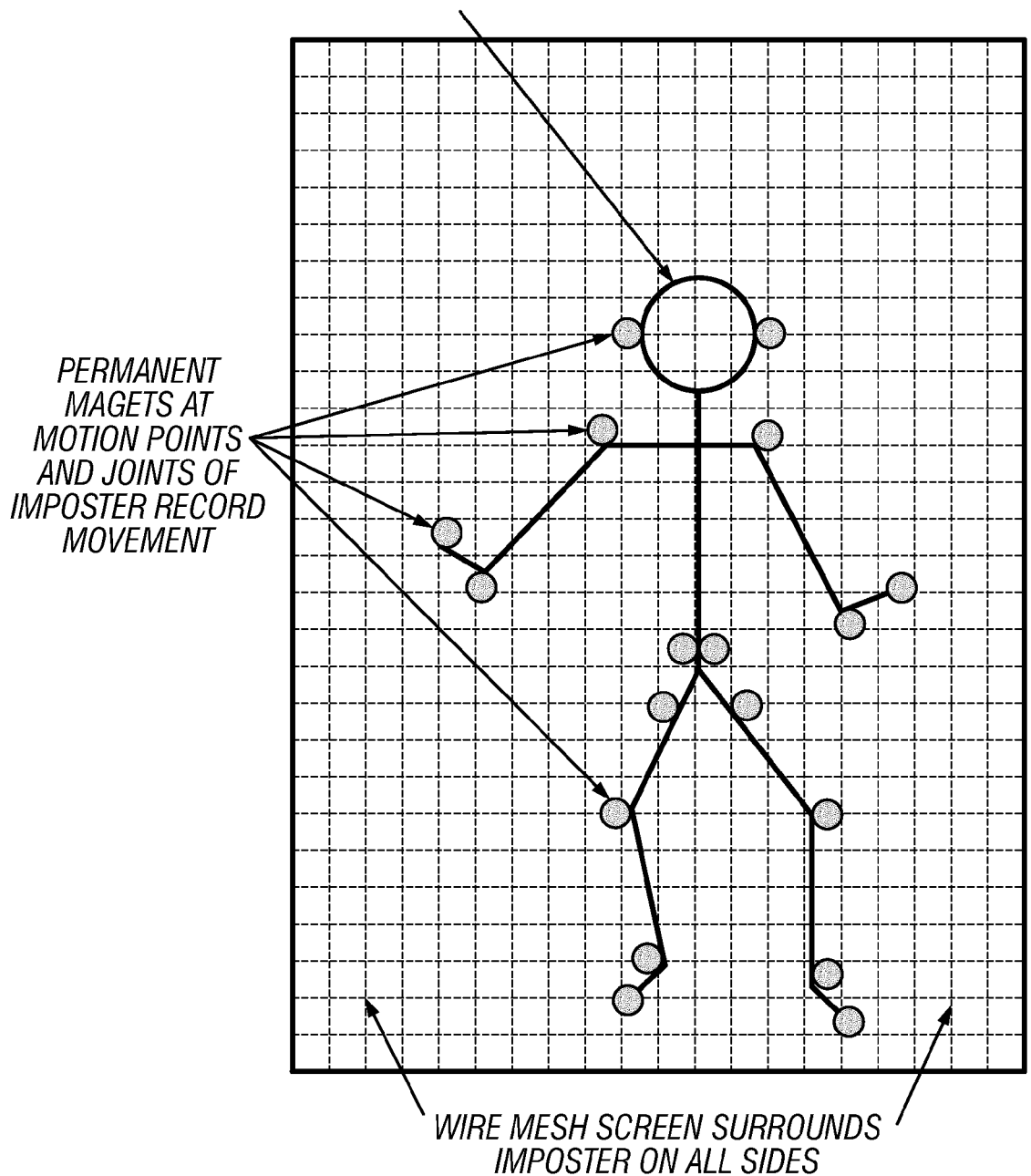
FIG. 5 illustrates a wire mesh surrounding an imposter and capturing information from the imposter.

FIG. 5 illustrates how an "imposter" can carry out movements with magnets at their motion points. A wire mesh surrounds the imposter at all locations of movement, and the motion points record the imposter's movement as the imposter moves.

Figure 6A:
FIGS. 6A and 6B show how an image can have parts removed, and those parts can be replaced with other image parts.
Figure 6B:
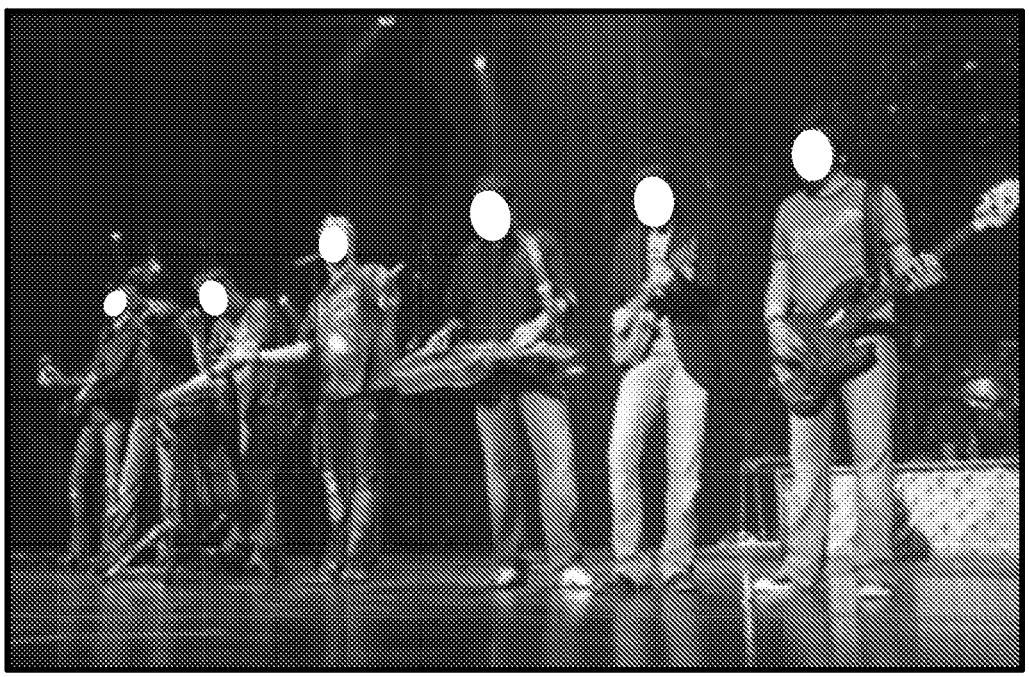

Another embodiment, illustrates how an original image of a garage band in FIG. 6A can be modified to remove faces that can be used for superimposed face images. FIG. 6B shows how the faces are removed, and faces from the cameras, e.g., 112, can be used instead. This allows each or any of the remotely-located bandmembers to have their likenesses, e.g., their faces, movements, video, or any other individual characteristic, to be included in the video either as part of the music they create, or separately. This may be used as part of the embodiment of the virtual recording studio by using a number of different elements located in different locations or separately.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way.

This disclosure is intended to be exemplary, and the claims are intended to cover any modification or alternative which might be predictable to a person having ordinary skill in the art. For example, other instruments can be used; other media (other than the internet) can be used; other kinds of videos can be made in this way.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A system comprising:
   a mixer, operating to mix together a plurality of different instruments to form a recording, said mixer including a computer that carries out mixing together said instruments, and said mixer having inputs for a plurality of different musical instruments,
   and where at least one of said inputs obtains digital musical information from at least one musical instrument over a digital channel, wherein said at least one input originates from a remote location, also receives at least one input at a local location, and where said mixer also includes a video editing part that obtains body movement information and creates a video that includes said body movement information with said mixing of said different musical instruments.

2. A system as in claim 1, wherein said mixer obtains information indicative of said movements from one of the people playing said musical instruments.

3. A system as in claim 2, wherein said mixer obtains information indicative of said movements from an actor who is not playing one of said musical instruments.

4. A system as in claim 2, further comprising at least one camera at said remote location, that obtains said information indicative of movement, and wherein said mixer also includes a video editing part that combines an image from the camera with at least one other image to create a simulated image including both a part from a remote location and said another part.

5. A system as in claim 1, wherein said body movement information is obtained from a device that three dimensionally monitors a movement of a body.

6. A system as in claim 3, wherein said mixer operates for combining a video of said actor with motion information that is obtained from a device that three dimensionally monitors a movement of a body of said actor, and using said motion information to impart motion to said video of said actor.

7. A system as in claim 4, wherein said image from said remote location is combined with a stored image, where a portion of said stored image is replaced by an image from said camera.

8. A method, comprising:
   receiving, into a computer mixer, at least a first input from a remote location from the mixer, received over the Internet, and also receiving a second input from a local location;
   said inputs representing a plurality of different instruments, and mixing said inputs to form a recording,
   said computer mixer including a video editing part that obtains body movement information and creates a video that includes said body movement information with said mixing of said different musical instruments and
   said mixing together said first and second inputs to create a mixed audio output as said recording.

9. A method as in claim 8, wherein said computer mixer obtains information indicative of said movements from one of the people playing said musical instruments.

10. A method as in claim 8, wherein said computer mixer obtains information indicative of said movements from a person who is not playing said musical instruments.

11. A method as in claim 10, further comprising obtaining motion from an imposter who is carrying out movement, and combining said motion information with said stored image to create a simulated motion part that moves according to a motion of the imposter.

12. A method as in claim 9, further comprising combining said video with said mixed audio output.

13. A method as in claim 8, further comprising a third input from a different remote location, wherein said first, second and third inputs are combined to create a combined mixed audio output.

14. A method as in claim 13, further comprising a first camera at said first location, a second camera at said second location and a third camera at said third location, and further comprising mixing together inputs from said cameras to create a mixed video output based on the same program as said audio output.

15. A method as in claim 14, wherein said mixed video output is a still image including image parts from said first second and third locations.

16. A method as in claim 14, wherein said mixed video output is a video image including image parts from said first, second and third locations.

17. A method as in claim 16, further comprising animating said video image according to imposter motion.

* * * * *